United States Patent [19]

Scherer et al.

[11] 3,967,634
[45] July 6, 1976

[54] FLOW RATIO CONTROL SYSTEM

[75] Inventors: William C. Scherer, Minneapolis; Michael Dwain Jines, Owatonna, both of Minn.

[73] Assignee: Graco Inc., Minneapolis, Minn.

[22] Filed: Nov. 6, 1975

[21] Appl. No.: 629,378

[52] U.S. Cl. .................................. 137/99; 222/135
[51] Int. Cl.² .................................... G05D 11/035
[58] Field of Search ............... 137/99; 222/134, 135

[56] References Cited
UNITED STATES PATENTS

| | | | |
|---|---|---|---|
| 2,887,094 | 5/1959 | Krukemeier | 137/99 X |
| 3,135,279 | 6/1964 | Dunklee | 137/99 |
| 3,224,642 | 12/1965 | Martelaere | 222/134 |

*Primary Examiner*—Robert G. Nilson
*Attorney, Agent, or Firm*—Paul L. Sjoquist

[57] ABSTRACT

Apparatus is disclosed for delivering two or more liquids in predetermined ratios, where the liquids are pumped by separate reciprocating pistons, the stroke of each piston being independently adjustable by means of a pivotal piston rod anchor and an adjustable piston arc control mechanism. All of the pistons are interconnected by means of an angularly rotating metering shaft which is in turn connected to a toggle valve mechanism for reversing the piston drive control upon reaching a predetermined amount of angular rotation. Since all interconnected pistons pass through the same angular value, but along independently adjustable arcs of travel, the respective strokes of each piston may be thereby controlled. A novel air valving mechanism for accomplishing the reversal and control of valves which regulate the fluid flow in contact with the respective pistons forms a part of the present invention.

16 Claims, 5 Drawing Figures

FLOW RATIO CONTROL SYSTEM

BACKGROUND OF THE INVENTION

This invention relates to an apparatus for delivering two or more liquids under precise proportioning or fluid ratio control. More specifically, the apparatus relates to a reciprocating pumping system having variable stroke metering cylinders which are interconnected so as to form a unitary liquid delivery system wherein the proportions of each liquid may be precisely regulated.

The need for fluid ratio delivery systems is increasing as more and more fluids are developed which may be combined at some ultimate mixing or destination point to form a mixture suitable for particular applications. For example, some modern paint compositions require the precise mixing of a base or catalyst material with a colorant additive, the combined mixture of which is delivered to a paint application system. It is frequently necessary to isolate the components prior to mixing, as they have certain volatile curing characteristics which give them a very short useful life when mixed, but which enables them to be stored over rather long periods of time in an unmixed condition. For this type of material it is inadvisable to premix the components at the point of manufacture because they would either require special sealing and handling conditions prior to their use or they would become severely degraded in quality and composition. In instances where a single base material may be mixed with any of a plurality of optional color components it is economically more desirable to package the base material in a separate container and to package each of the components in individual containers.

Precision proportioning of liquids using reciprocating pumping devices presents particular problems, because fluid metering becomes unpredictable and somewhat erratic at the point where the reciprocating device changes its stroke direction. On the other hand, reciprocating pumping devices have certain advantages in that they are simply and economically constructed and may be driven readily by reciprocating air or hydraulic motors, or other pressurized fluid sources. It is possible to minimize the changeover metering problem by ganging together a plurality of these metering cylinders so that all cylinders go through their changeover stroke phase at the same instant. This does not eliminate the unstable metering situation which exists during changeover, but tends to equalize the instability by requiring all metering cylinders to undergo change-over together. Thus, if fluid delivery from a particular metering cylinder is reduced by a significant percentage during the short interval of time while the piston changes its reciprocating direction, other cylinders having pistons ganged together will similarily reduce their flows by nearly identical percentages during the same interval of time. The net result may be an overall fluctuation in the flow rate of the combined mixture, but the relative proportions of each of the components of the mixture will tend to vary in the same direction and ensure that the flow ratios remain constant. These desirable effects are achieved with the present invention, which uses reciprocating metering cylinders to the advantages stated herein.

SUMMARY OF THE INVENTION

The present invention comprises a plurality of metering cylinders having reciprocating pistons therein. Each of the piston and cylinder assemblies has an end pivotally anchored to a common base so that the assembly has freedom of travel in an arc about the pivot point. The respective other ends of the piston and cylinder assemblies are each connected to a lever arm having a threadable adjustment for varying the point along the lever arm where the assembly may be attached. All lever arms are joined about an angularly rotatable shaft which has a linkage at one end thereof for controlling valving mechanisms for regulating the valving of fluid into all of the piston and cylinder assemblies. When the angularly rotatable shaft turns by a predetermined amount it causes a toggle mechanism to reverse a valve controlling individual valves for delivering fluid to the respective cylinders. This causes all cylinders to change over their reciprocation direction and thereby reverse their stroke. Fluid is delivered by each piston cylinder assembly during both stroke directions, but the length of each piston stroke is determined by its point of attachment to the lever joined to the angularly rotatable shaft.

BRIEF DESCRIPTION OF THE DRAWINGS

A preferred embodiment of the present invention is described hereinafter, with reference to the drawings, in which.

DESCRIPTION OF THE PREFERRED EMBODIMENT

Figure 1:
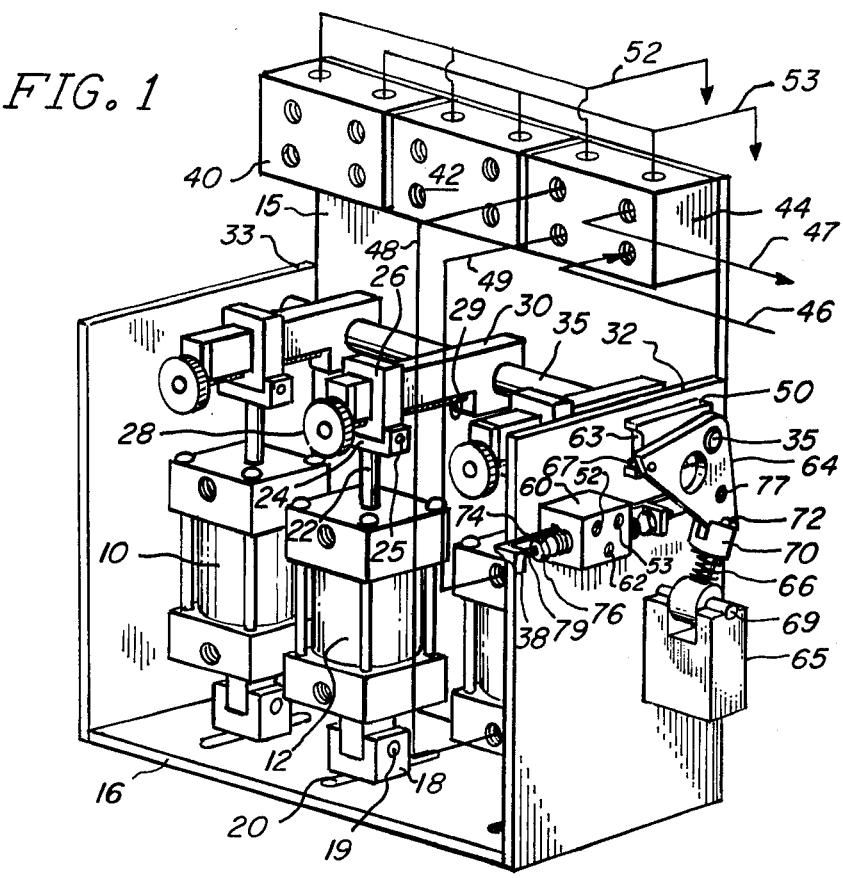
FIG. 1 illustrates an isometric view of an embodiment of the invention utilizing three cylinders.

Referring first to FIG. 1, a preferred embodiment of the invention is shown in isometric view. Three cylinders, 10, 12, and 14 are mounted on a base plate 16, which forms a part of a frame 15. While the function of the cylinders may differ, their construction may be identical for purposes of the present invention. For purposes of explanation herein, the detailed construction of cylinder 12 and its associated hardware will be presented, with the understanding that cylinders 10 and 14 may be similarly described.

Cylinder 12 is pivotally mounted to a yoke 18 via a pivot pin 19. Yoke 18 is attached to base plate 16 by means of a bolt or other similar fastener. The fastening means may be loosened to permit yoke 18 to be positioned along a slot 20 cut into base plate 16. A rod 22 slidably projects from the assembly housing cylinder 12. Rod 22 is connected to an internal piston, and is connected at its upper end to a yoke 24 which is pivotally attached to a movable collar 26 by means of a pin 25. Collar 26 is slidably mounted about lever 30, and may be moved in and out by rotating adjustment wheel 28 which is connected to a threaded shaft 29. Threaded shaft 29 passes through collar 26 and causes collar 26 to thread inwardly and outwardly along the threaded shaft. Lever 30 is rigidly attached to metering shaft 35, and all other similarly placed levers are also rigidly attached to metering shaft 35. Metering shaft 35 is rotatably mounted between two outer bearing blocks 32 and 33, each of which has a suitable bearing for permitting angular rotation of shaft 35. This angular rotation is transmitted to a valve control mechanism via position lever 50 as will be hereinafter described.

Attached to frame 15 are three valving assemblies 40, 42, and 44 associated respectedly with cylinders 10, 12, and 14. The fluid coupling connections between each of these valve assemblies and the respective cylinder connected thereto is similar for all three assemblies. A typical connection is diagrammatically illustrated in FIG. 1 with respect to cylinder 14 and valve assembly 44, it being understood that the remaining two cylinders may be identically connected. A fluid inlet line 46 is connected to a supply of pressurized fluid of the type to be metered by the system. A fluid outlet line 47 is similarly connected to the mixing destination where the proportioned fluids are to be combined. Lines 48 and 49 connect the interior of cylinder 14 to the valve assembly 44, and transport the metered fluid into and out of cylinder 14. Control lines 52 and 53 are coupled to suitable control valving mechanisms to be hereinafter described, and serve to regulate the internal flow paths of valve assembly 44.

Figure 2:
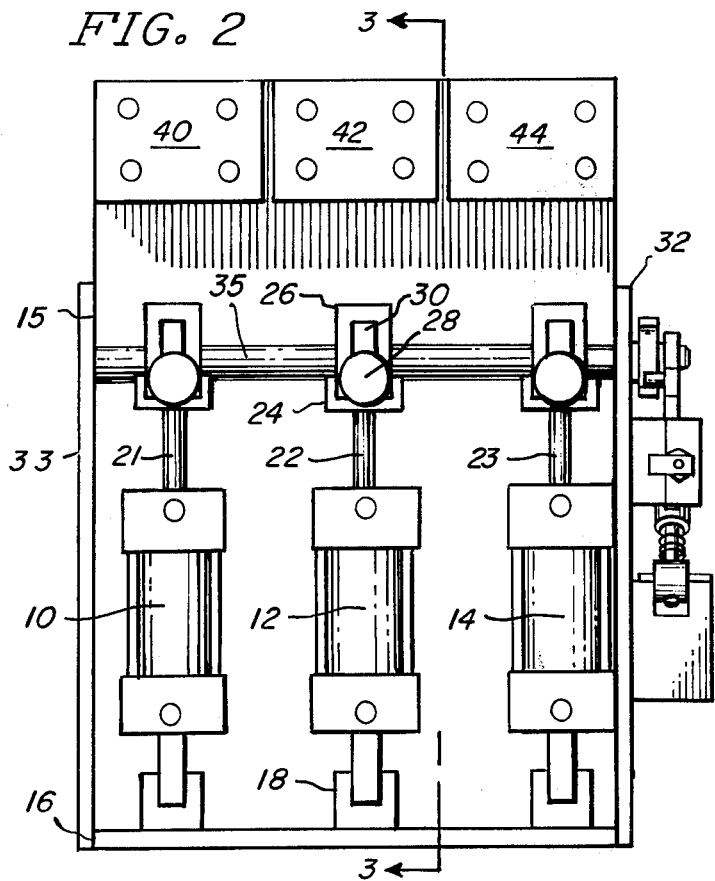
FIG. 2 shows the embodiment in front view.

FIG. 2 illustrates the preferred embodiment of FIG. 1 in front view. Cylinders 10, 12, and 14 are positioned adjacent one another on base plate 16. Their respective piston rods 21, 22, and 23 connect to yokes which are pivotally attached to collars, such as yoke 24 and collar 26 for rod 22. Each of the collars are movable inwardly and outwardly by adjustment of the respective adjustment wheels, such as wheel 28 for collar 26.

Figure 3:
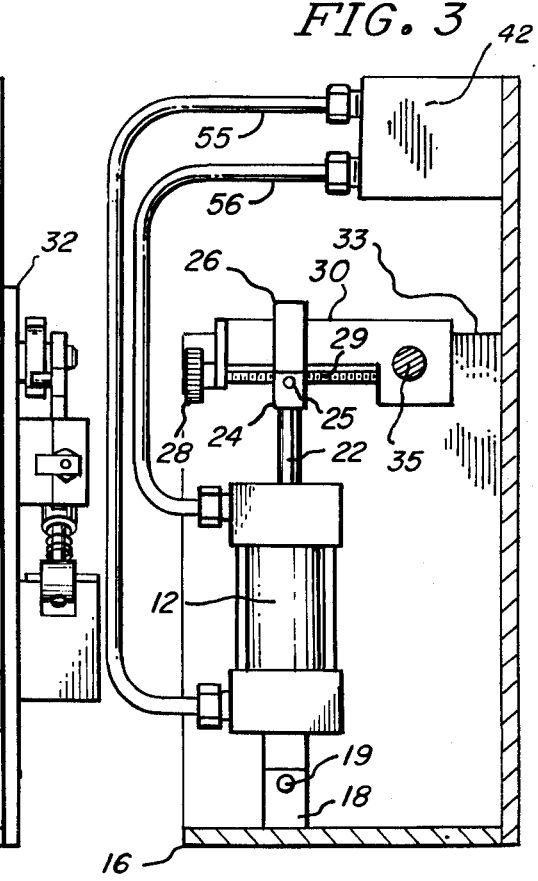
FIG. 3 shows the invention taken along the lines 3—3 in FIG. 2.

FIG. 3 illustrates the apparatus of FIG. 2 in cross section, taken along the lines 3—3. Cylinder 12 is illustrated positioned in a relatively vertical position, although adjustment wheel 28 may be rotated to change the angular position of cylinder 12 over approximately 20 degrees. Turning adjustment wheel 28 causes collar 26 to slide inwardly along lever 30, because adjustable thread 29 is held in a fixed lateral position relative to lever 30 and has mating threads passing through collar 26. As collar 26 is moved inwardly pivot pin 25 moves closer to metering shaft 35, thereby tilting piston rod 22 toward metering shaft 35. For a given angular deflection of metering shaft 35, the pivot pin 25 end of piston rod 22 will circumscribe a smaller arc as it is adjusted toward metering shaft 35. Thus, for relatively shorter strokes of the piston inside of cylinder 12, adjustment wheel 28 is rotated so as to cause collar 26 to move toward metering shaft 35. Conversely, if relatively larger strokes are desired for metering system 12, adjustment wheel 28 is oppositely rotated to cause collar 26 to move outwardly away from metering shaft 35.

Hoses 55 and 56 interconnect valve assembly 42 with cylinder 12. Hose 56 connects to the interior of cylinder 12 at a point above its piston, and hose 55 connects to a point in the interior of cylinder 12 below its piston. These connections enable the piston to meter fluid during both its upstroke and its downstroke.

Figure 4:
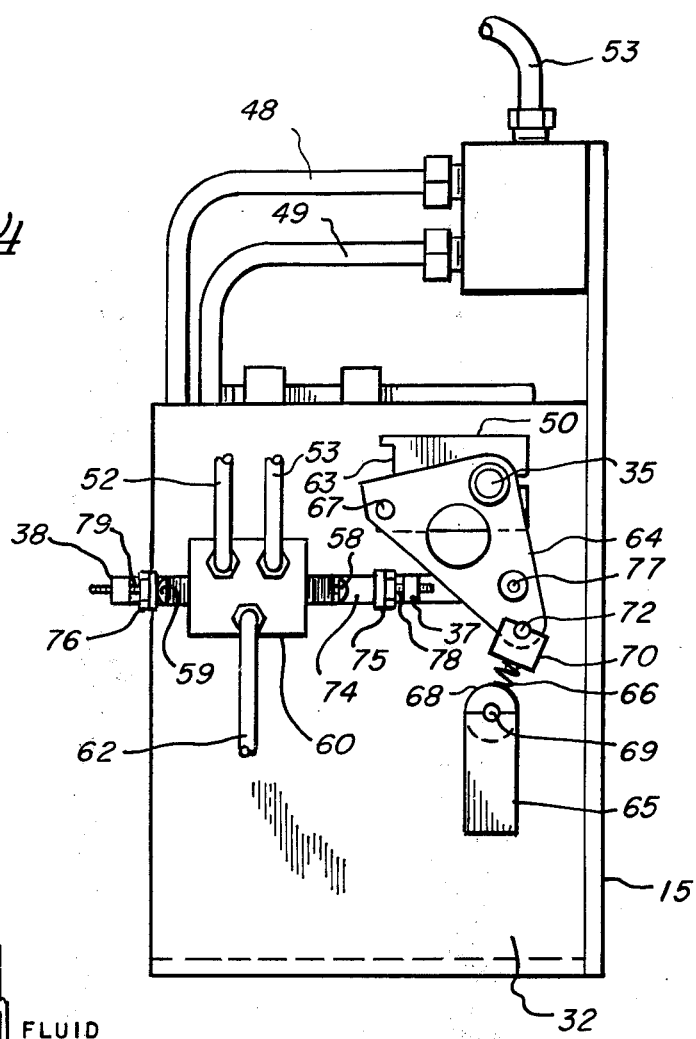
FIG. 4 shows the invention in side view.

FIG. 4 shows the invention in side view and illustrates the valve control mechanism used with the present invention. Valve assemblies 40, 42, and 44 each have connected thereto air control lines 52 and 53. These lines originate at air valve 60 which has connected thereto a source of compressed air via air line 62. Air valve 60 is actuated by push buttons 58 and 59 to cause pressurized air from line 62 to be directed either toward line 52 or 53, and to exhaust to the atmosphere pressurized air from the line 52 or 53 not selected. Air valve 60 may be readily obtainable from commercial devices in the art, such as model 41PP, manufactured by Humphrey Products. Push button 58 is actuated by toggle link 64, which is pivotally mounted on shaft 35. Toggle link 64 is pivotally moved by position lever 50 bearing against the projecting pin 67 along slot 63. Position lever 50 is rigidly attached at its other end to metering shaft 35, and an angular rotation of shaft 35 causes the slotted end of position lever 50 to move upwardly and downwardly.

A snap-action movement of toggle link 64 is provided by toggle spring 66, which is attached at its lower end to rotatable cam 68 and at its upper end to link 70. Link 70 is pivotally connected to toggle link 64 by means of pin 72, and cam 68 is rotatably connected to bracket 65 by means of pin 69. When the upward movement of position lever 50 causes toggle link 64 to pivot so as to cause link 70 to pass over the center loading point of toggle spring 66, toggle link 64 suddenly snaps to a second position thereby depressing push button 58. Similarly, when position lever 50 moves downwardly by a predetermined distance toggle link 64 again passes over the center loading point to cause a snap action force against push button 59 to depress the push button. In this manner, push buttons 58 and 59 are either depressed or released depending upon the excursion of position lever 50. Pushbuttons 58 and 59 are internally connected within air valve 60 to cause them to move laterally in unison. The pushbutton toggling mechanism comprises a slide bar 74 which is slidably mounted on frame 15 in a channel constructed for that purpose. Slide bar has a raised shoulder 75 for contacting against pushbutton 58, and a second raised shoulder 76 for contacting against pushbutton 59. One end of slide bar 74 is pivotally attached to toggle link 64 via pin 77, which causes the slide bar to laterally slide in response to the toggling motion of toggle link 64. Shoulders 75 and 76 are each adjustable on slide bar 74 by means of threaded screws 78 and 79, respectively, which are threaded through slide bar blocks 37 and 38.

When push button 58 is in its depressed position valve 60 delivers pressurized air from line 62 to line 52, and relieves line 53 to the atmosphere. When push button 59 is in its depressed position valve 60 delivers pressurized air from line 62 to line 53, and relieves line 52 to the atmosphere. Lines 52 and 53 are control air lines for actuating valve assemblies 40, 42, and 44 as will be hereinafter described.

Figure 5:
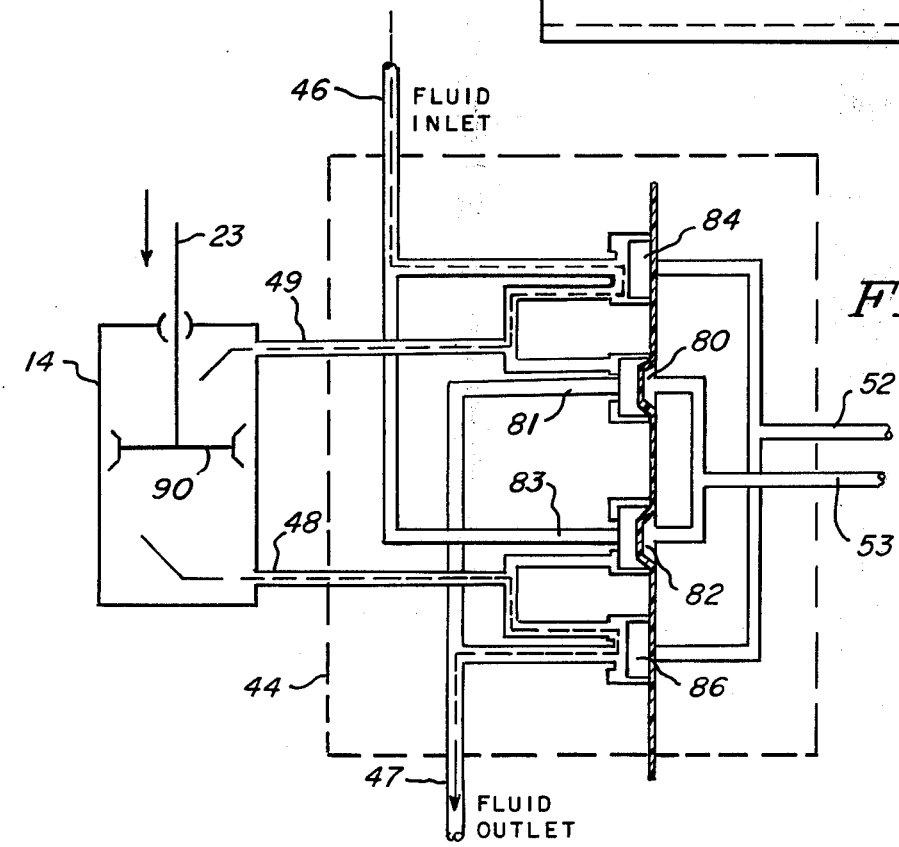
FIG. 5 is a diagrammatic illustration of the valving of the invention.

FIG. 5 illustrates diagrammatically the operation of valve assembly 44, it being understood that valve assemblies 40 and 42 operate identically. For purposes of explanation, it will be assumed that line 53 is pressurized and line 52 is exhausted to the atmosphere by air valve 60.

Line 53 delivers pressurized air to diaphragm valves 80 and 82, respectively, closing valves 80 and 82. Valve 80 blocks port 81 to outlet 47, and valve 82 blocks port 83 from inlet 46. Line 52, exhausted to atmospheric pressure, is coupled to diaphragm valves 84 and 86. Diaphragm valve 84 is therefore opened to the flow of pressurized fluid from inlet line 46, and delivers this fluid to line 49 which enters at the top of cylinder 14. Line 48, opening from the bottom of cylinder 14, is fluid coupled via valve 86 to fluid outlet 47. Therefore, during the downstroke of piston rod 23 and piston 90, fluid is admitted via line 49 into the upper portion of cylinder 14 and is expelled via line 48 from the lower portion of cylinder 14.

Prior to the upstroke of piston 90, pressurized air is switched from line 53 to line 52, and line 53 becomes exhausted to the atmosphere. This causes valves 84 and 86 to become closed and valves 80 and 82 to become opened. Valves 84 and 86, respectively, close the fluid inlet and outlet ports, and valves 82 and 80, respectively, open different fluid inlet and outlet ports to enable pressurized fluid in the upper portion of cylinder 14 to be metered through fluid outlet 47 and pressurized fluid to be admitted into the lower portion of cylinder 14 via valve 82.

Each of the valve assemblies 40, 42, and 44 operate in the manner hereinbefore described for valve assembly 44. In a typical and preferred embodiment pressurized fluid, which may be selected components of a paint mixture or other proportional fluid mixture, is coupled to each of the fluid inlets of valves 40, 42 and 44. The respective adjustment wheels on each cylinder lever are adjusted to position each cylinder piston rod for the desired fluid proportions. Actual fluid proportions may be initially empirically determined by adjustment of the respective adjustment wheels and running a small amount of fluid through the system, and the adjustment wheels may be calibrated thereby. The respective fluid outlets from valves 40, 42 and 44 are coupled, usually via shutoff valves, to the destination where the proportioned fluid mixture is to be delivered or collected. When the shutoff valves are opened the system will begin delivering fluid proportioned according to the relative settings of the respective adjustment wheels, and fluid will continue to be delivered for as long as the shutoff valves remain open.

In an alternative embodiment, one of the cylinders 10, 12, or 14 is utilized as a driving cylinder and the remaining two (or more in some cases) are used as metering cylinders. For example, cylinder 14 may be coupled to a source of pressurized hydraulic fluid and the actuation of air valve 60 will be utilized to control the pressurized fluid force on piston 90 within cylinder 14. The application of pressurized hydraulic fluid to the top surface of piston 90 will cause the piston to move downwardly. Piston rod 23, which is connected to metering shaft 35, will cause the metering shaft 35 to angularly rotate and follow the movement of piston rod 23. This will in turn cause the piston rods attached to the other cylinders and pistons to follow the movement of the driven cylinder. Similarly, when valve assembly 44 directs the flow of pressurized hydraulic fluid into the bottom portion of cylinder 14 piston 90 is driven upwardly. This upward motion is transferred to the metering cylinders via metering shaft 35 as hereinbefore described. Thus, in this embodiment one or more metering cylinders may be driven by a hydraulically actuated cylinder through the common apparatus and attachments described herein. The relative stroke displacements of each of the cylinders may be adjustably controlled as described herein, and metered fluid proportions determined accordingly. To further affect fluid metering proportions, the metering cylinders may be selected of different size having pistons of different cross-sectional area. However the ratio of upstroke piston area to downstroke piston area must be constant for all cylinders in order that proportioning can be kept constant in both stroke directions. This requirement, in combination with the variable and adjustable features described herein, enable nearly any desired proportion to be selected for the metering of fluids.

What is claimed is:
1. An apparatus for delivering an adjustable fluid flow ratio of two or more fluids from respective fluid supply sources, comprising,
   a. a plurality of cylinder and piston assemblies, each pivotally anchored at one end and having a reciprocable piston rod attached to its piston and projecting from its other end;
   b. a plurality of levers pivotally attached, each to a respective piston rod, by means of an attachment link which is slideable along said lever;
   c. a rotatable shaft rigidly attached to all of said levers, and having a projecting arm for translating its angular motion to arcuate motion of said arm end;
   d. a plurality of air-actuated valves, each coupled to a cylinder and piston assembly, for controlling the fluid flow direction into and out of said cylinder and piston assemblies;
   e. an air valve connected in actuating air coupling to said plurality of air-actuated valves, said air valve having an actuating arm for selectively directing air flow through said valve, and said air valve being connectable to a source of pressurized air; and
   f. toggle lever means, connected between said rotatable shaft projecting arm and said air valve actuating arm, for toggling said air valve in response to angular position of said rotatable shaft.

2. The apparatus of claim 1, further comprising means for selectively adjusting the slideable position of said attachment link relative to said lever.

3. The appartus of claim 2, further comprising means, coupled to said cylinder and piston pivotal anchor, for movably positioning said anchor point.

4. The apparatus of claim 2, wherein said means for selectively adjusting further comprises a threaded shaft in threadable engagement with said attachment link.

5. The apparatus of claim 4, wherein said attachment link further comprises a collar surrounding said lever in slideable engagement.

6. The apparatus of claim 5, wherein said toggle lever means further comprises a pivotal link having ears engageable against said rotatable shaft projecting arm and having a link surface for contacting said air valve actuating arm.

7. The apparatus of claim 6, wherein said toggle lever means further comprises a toggle spring engaged against said link to urge said link in either of two stable positions.

8. The apparatus of claim 7, wherein each of said air-actuated valves further comprise a fluid channel respectively coupled to the upper and lower interior portions of said cylinder, and fluid input and output ports, and valve means for selectively coupling said upper and lower fluid channels to said input and output ports.

9. The apparatus of claim 8, wherein said valve means further comprises air actuable diaphragms for said selective coupling functions.

10. The apparatus of claim 9, wherein said air valve further comprises a pressurized air input port and an exhaust air output port, and control ports for selectively connecting to said input and output ports.

11. The apparatus of claim 10, further comprising means for coupling said air valve control ports to said air actuable diaphragms.

12. The apparatus of claim 11, wherein said means for coupling further comprises a valve connected to said pivotal link.

13. An apparatus for metering fluid flow of at least two fluids in controlled proportions, comprising:
   a. a first cylinder and piston assembly having said cylinder pivotally anchored on a base and having a reciprocable first piston rod attached to said piston, said assembly being connected to a source of pressurized hydraulic fluid through a hydraulic fluid valve selectively actuable to cause said pressurized hydraulic fluid to exert an upward and downward force on said piston;
   b. a rotatable shaft having a first lever rigidly attached thereto, said lever having a slideable collar thereon, said collar pivotally attached to said first piston rod;
   c. means for selectively positioning said collar along said lever;
   d. means, connected to said rotatable shaft and to said hydraulic fluid valve, for reversibly actuating said hydraulic fluid valve in response to angular excursions of shid shaft;
   e. at least a second and third cylinder and piston assembly, each having its cylinder pivotally anchored on said base and having a reciprocable piston rod attached to a piston, each assembly being independently connected to a source of fluid for metering fluid flow thereof through a fluid valve selectively actuable to cause said metered fluid to flow into the upper and lower portion of said cylinder above and below said piston respectively, each of said piston rods being pivotally connected to a collar surrounding and slideably fitted over a lever, said lever being rigidly attached to said rotatable shaft, and including means for selectively positioning said collar along said lever; and
   f. means, connected to said means for reversibly actuating said hydraulic fluid valve, for selectively actuating in synchronism all of said fluid valves.

14. The apparatus of claim 13, wherein each of said means for positioning said collars further comprises a rotatable threaded shaft in threadable engagement with said collar.

15. The apparatus of claim 14, wherein said means for reversibly actuating said hydraulic fluid valve further comprises a lever arm attached to said rotatable shaft, a pivotal link connected to said lever arm, and a two-position valve actuable by said pivotal link.

16. The apparatus of claim 15, wherein said means for selectively actuating in synchronism all of said fluid valves further comprises means for coupling said two-position valve to all of said fluid valves.

* * * * *